(12) United States Patent
Ishitsuka

(10) Patent No.: US 11,780,598 B2
(45) Date of Patent: Oct. 10, 2023

(54) AIRCRAFT

(71) Applicant: HONDA MOTOR CO., LTD., Tokyo (JP)

(72) Inventor: Yuji Ishitsuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/694,721

(22) Filed: Mar. 15, 2022

(65) Prior Publication Data
US 2022/0306304 A1 Sep. 29, 2022

(30) Foreign Application Priority Data
Mar. 26, 2021 (JP) ................................ 2021-052506

(51) Int. Cl.
| | |
|---|---|
| B64D 27/14 | (2006.01) |
| B64C 3/00 | (2006.01) |
| B64C 1/26 | (2006.01) |
| B64C 27/22 | (2006.01) |
| B64C 1/06 | (2006.01) |
| B64D 27/24 | (2006.01) |

(52) U.S. Cl.
CPC ................ *B64D 27/14* (2013.01); *B64C 1/26* (2013.01); *B64C 3/00* (2013.01); *B64C 1/061* (2013.01); *B64C 1/064* (2013.01); *B64C 1/068* (2013.01); *B64C 27/22* (2013.01); *B64D 27/24* (2013.01)

(58) Field of Classification Search
CPC .............................. B64D 27/14; B64D 27/26
See application file for complete search history.

(56) References Cited

U.S. PATENT DOCUMENTS

| | | | | |
|---|---|---|---|---|
| 4,500,055 A | * | 2/1985 | Krojer | B64D 27/14 244/65 |
| 2019/0168883 A1 | * | 6/2019 | Buchholz | F02C 7/32 |
| 2020/0115045 A1 | | 4/2020 | Mermoz et al. | |
| 2020/0331589 A1 | * | 10/2020 | Cummings | B64C 5/02 |

OTHER PUBLICATIONS

Pat Flannigan, "Semi Monocoque, Mono—What?", Aviation Chatter, Jan. 19, 2010 (Year: 2010).*

* cited by examiner

*Primary Examiner* — Philip J Bonzell
*Assistant Examiner* — Brendan Kroger Schneider
(74) *Attorney, Agent, or Firm* — AMIN, TUROCY & WATSON, LLP

(57) ABSTRACT

An aircraft includes a fuselage, a wing disposed above the fuselage, a pylon connecting the wing to the fuselage, and a plurality of internal combustion engines housed in the fuselage. The pylon vertically traverses the fuselage and is fixed to an upper portion and a lower portion of the fuselage. Among the plurality of internal combustion engines, a first internal combustion engine and a second internal combustion engine are disposed bilaterally symmetrically about the pylon and are fixed to the pylon.

6 Claims, 9 Drawing Sheets

AIRCRAFT

CROSS-REFERENCE TO RELATED APPLICATIONS

This application is based upon and claims the benefit of priority from Japanese Patent Application No. 2021-052506 filed on Mar. 26, 2021, the contents of which are incorporated herein by reference.

BACKGROUND OF THE INVENTION

Field of the Invention

The present invention relates to an aircraft including a plurality of internal combustion engines.

Description of the Related Art

US 2020/0115045 A1 discloses an aircraft referred to as an electric vertical take-off and landing aircraft (eVTOL aircraft). This aircraft includes a plurality of takeoff and landing rotors and a plurality of cruise rotors. Each of the plurality of takeoff and landing rotors is disposed on one of the left and right sides of a fuselage. Each of the plurality of cruise rotors is disposed above a rear wing. This aircraft is capable of generating power by driving a generator with an internal combustion engine. This aircraft is capable of rotating each rotor by supplying the generated power to an electric motor.

SUMMARY OF THE INVENTION

In an electric vertical take-off and landing aircraft, an internal combustion engine for power generation is housed inside a fuselage. However, the space inside the fuselage is limited, and it is necessary to improve the maintainability of the internal combustion engine. For the above reasons, it is necessary to devise the arrangement and mounting of the internal combustion engine.

An object of the present invention is to solve the aforementioned problem.

According to an aspect of the present invention, provided is an aircraft comprising: a fuselage; a wing disposed above the fuselage; a pylon configured to connect the wing to the fuselage; and a plurality of internal combustion engines housed in the fuselage, wherein the pylon vertically traverses the fuselage and is fixed to an upper portion and a lower portion of the fuselage, and among the plurality of internal combustion engines, a first internal combustion engine and a second internal combustion engine are disposed bilaterally symmetrically about the pylon, and are fixed to the pylon.

According to the present invention, the internal combustion engines can be disposed in a well-balanced manner and stabilized inside the fuselage.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

1. Overall Configuration of Aircraft 10

Figure 1:
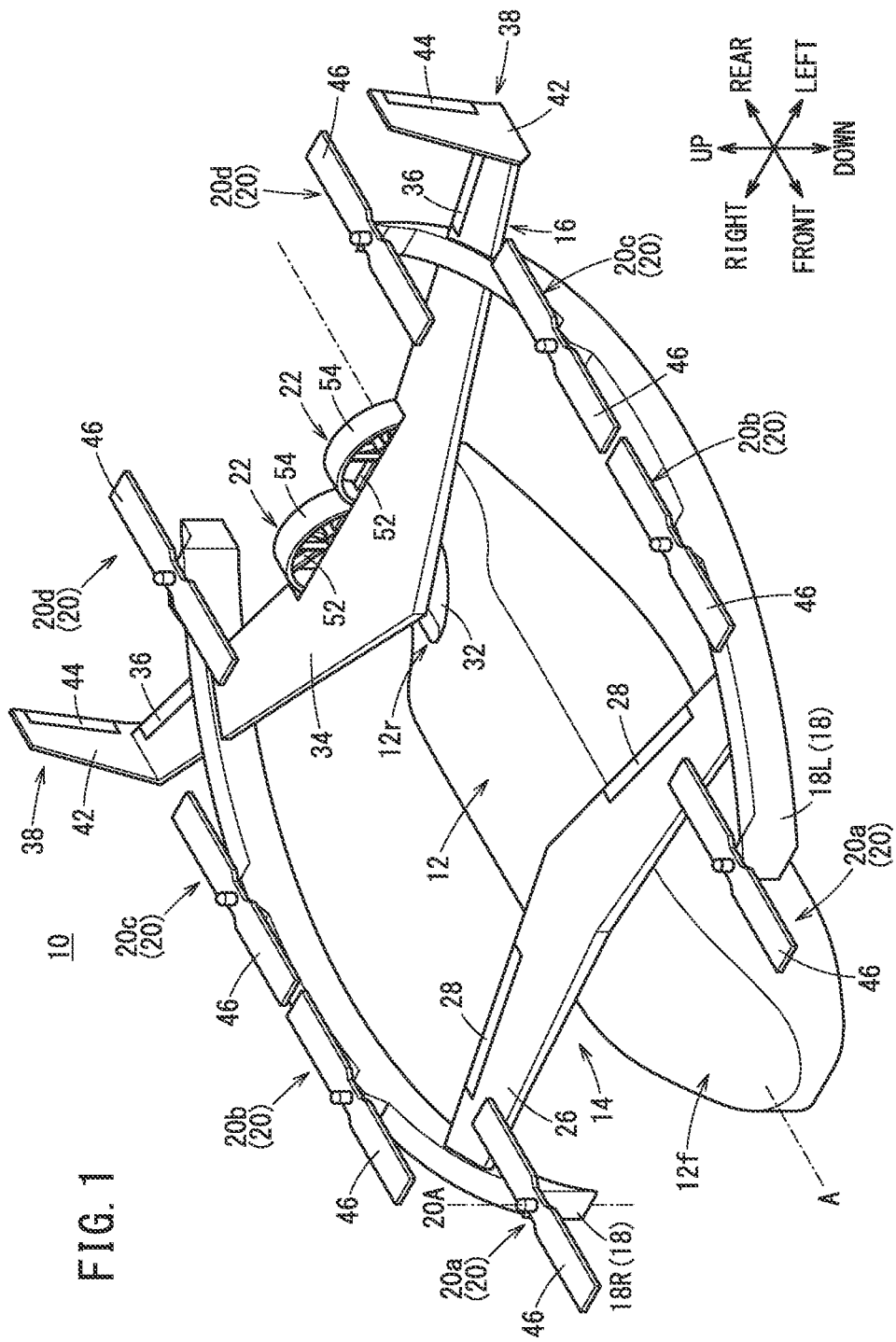
FIG. 1 is a perspective view of an aircraft.

The overall configuration of an aircraft 10 will be described with reference to FIGS. 1 and 2. In the present embodiment, an electric vertical take-off and landing aircraft is assumed as the aircraft 10. Electric vertical take-off and landing aircraft are referred to as eVTOL aircraft. The eVTOL aircraft generates lift and thrust by using rotors with electric motors as their drive sources. In this specification, a vertically upward direction is referred to as an upward direction. A vertically downward direction is referred to as a downward direction. Further, a moving direction of the aircraft 10 when the aircraft 10 moves (flies) in the horizontal direction is referred to as a forward direction. A direction opposite to the forward direction is referred to as a rearward direction. Further, when viewed from the aircraft 10 traveling forward, the right direction is defined as a right direction, and the left direction is defined as a left direction. Further, the plan view of the aircraft 10 refers to a state in which the aircraft 10 is viewed from above. The front view of the aircraft 10 refers to a state in which the aircraft 10 is viewed from the front.

The aircraft 10 includes a fuselage 12, a front wing 14, a rear wing 16, two booms 18, eight takeoff and landing rotors 20, and two cruise rotors 22. A central axis A of the fuselage 12 extends in the front-rear direction. The structure of the aircraft 10 is bilaterally symmetrical about a vertical plane including the central axis A. As shown in FIG. 2, in plan view, the central axis A overlaps with the center of gravity G of the aircraft 10.

The fuselage 12 is long in the front-rear direction. The fuselage 12 has a fuselage front portion 12f and a fuselage rear portion 12r. The fuselage front portion 12f is located in front of the center of gravity G. The fuselage rear portion 12r is located behind the center of gravity G. The fuselage front portion 12f becomes narrower toward the front end. The fuselage rear portion 12r becomes narrower toward the rear end. The fuselage 12 has a main body. The fuselage 12 may include the main body, and a fairing that covers a part of the main body. The main body and the fairing are referred to herein as the fuselage 12. A front portion of the fuselage 12 is referred to as the fuselage front portion 12f. A rear portion of the fuselage 12 is referred to as the fuselage rear portion 12r.

The front wing 14 is connected to an upper portion of the fuselage front portion 12f. The front wing 14 generates lift when the aircraft 10 moves forward. The front wing 14 includes a front wing main body 26, and left and right elevators 28. The front wing main body 26 extends to the left and right from the center of the fuselage 12. The front wing main body 26 is also referred to as a horizontal stabilizer. The left and right elevators 28 are disposed at the tailing edge of the front wing 14.

The rear wing 16 is connected to an upper portion of the fuselage rear portion 12r via a pylon 32. The rear wing 16 generates lift when the aircraft 10 moves forward. The rear wing 16 includes a rear wing main body 34, left and right elevons 36, and a pair of vertical tails 38. The rear wing main body 34 extends to the left and right from the center of the fuselage 12. Each elevon 36 is disposed at the tailing edge of the rear wing 16. The left vertical tail 38 is disposed at the left wing tip of the rear wing 16. The right vertical tail 38 is disposed at the right wing tip of the rear wing 16. Each vertical tail 38 includes a tail main body 42 and a rudder 44. The tail main body 42 is also referred to as a vertical stabilizer. The rudder 44 is disposed at the tailing edge of the vertical tail 38.

The area of the rear wing 16 is larger than the area of the front wing 14. Further, the width of the rear wing 16 is longer than the width of the front wing 14. With such a configuration, the lift generated by the rear wing 16 when the aircraft 10 moves forward is greater than the lift generated by the front wing 14. That is, the rear wing 16 functions as a main wing of the aircraft 10. The rear wing 16 is a swept wing. On the other hand, the front wing 14 functions as a canard wing of the aircraft 10.

The lift generated by the rear wing 16 when the aircraft 10 moves forward and the lift generated by the front wing 14 when the aircraft 10 moves forward may be substantially the same. The ratio between the lift generated by the front wing 14 and the lift generated by the rear wing 16 is appropriately determined depending on the position of the center of gravity G, the attitude of the airframe during cruising, and the like. In addition, the size of the front wing 14 and the size of the rear wing 16 are determined in order to generate desired lift. In this specification, the size of the wing is a wing area, a length, or the like.

The two booms 18 include a right boom 18R and a left boom 18L. The right boom 18R is disposed on the right side of the fuselage 12. The left boom 18L is disposed on the left side of the fuselage 12. The two booms 18 form a pair. The two booms 18 are arranged bilaterally symmetrically about the vertical plane including the central axis A. The two booms 18 are connected to the front wing 14 and the rear wing 16. The two booms 18 are connected to the fuselage 12 via the front wing 14 and the rear wing 16. The respective two booms 18 function as support members that support four takeoff and landing rotors 20.

The boom 18R is a bar member. The boom 18R extends from the front toward the rear. The boom 18R is curved in an arc shape toward the right side. The boom 18R may be a straight bar member. The boom 18R is connected to the right wing tip of the front wing 14. The boom 18R is connected to the right wing of the rear wing 16. The boom 18R is located on the left side of the right elevon 36 of the rear wing 16. The front end of the boom 18R is located in front of the front wing 14. The rear end of the boom 18R is located behind the rear wing 16.

The boom 18L is a bar member. The boom 18L extends from the front toward the rear. The boom 18L is curved in an arc shape toward the left side. The boom 18L may be a straight bar member. The boom 18L is connected to the left wing tip of the front wing 14. The boom 18L is connected to the left wing of the rear wing 16. The boom 18L is located on the right side of the left elevon 36 of the rear wing 16. The front end of the boom 18L is located in front of the front wing 14. The rear end of the boom 18L is located behind the rear wing 16.

Each of the eight takeoff and landing rotors 20 includes a mast (not shown), a hub (not shown), and a plurality of blades 46. The mast is connected to an output shaft portion of the electric motor (not shown). The hub is connected to the mast. The plurality of blades 46 are connected to the hub. The mast is arranged in parallel with the vertical direction. The mast is rotatable about a rotation axis 20A extending in the vertical direction. The plurality of blades 46 are located above the booms 18, the front wing 14, and the rear wing 16. The pitch angle of the blades 46 is variable. With such a structure, the takeoff and landing rotors 20 rotate about the rotation axis 20A and generate lift. One rotor unit for generating lift includes one takeoff and landing rotor 20, a rotation mechanism (the electric motor or the like), and a control circuit. Note that one rotor unit may include one or more batteries.

The eight takeoff and landing rotors 20 include four takeoff and landing rotors 20a to 20d on the right side, and four takeoff and landing rotors 20a to 20d on the left side. The right-side takeoff and landing rotors 20a to 20d are disposed on the right side of the fuselage 12. The left-side takeoff and landing rotors 20a to 20d are disposed on the left side of the fuselage 12. The right-side takeoff and landing rotors 20a to 20d are supported by the boom 18R. The left-side takeoff and landing rotors 20a to 20d are supported by the boom 18L. The right-side takeoff and landing rotor 20a and the left-side takeoff and landing rotor 20a form a pair. The position of the right-side takeoff and landing rotor 20a in the front-rear direction and the position of the left-side takeoff and landing rotor 20a in the front-rear direction are the same. The same applies to the left and right-side takeoff and landing rotors 20b to 20d.

Figure 2:
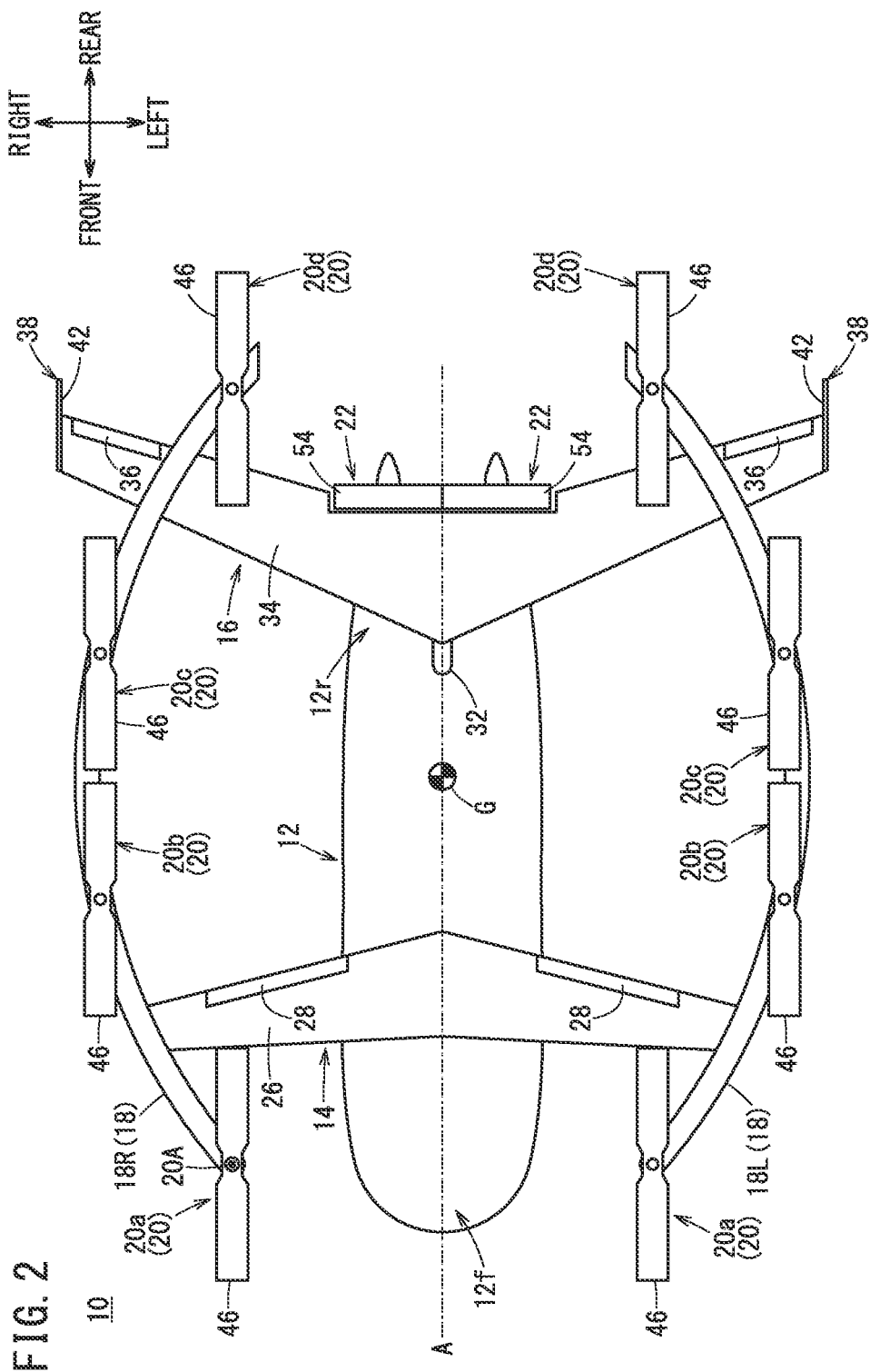
FIG. 2 is a plan view of the aircraft.
Figure 3:
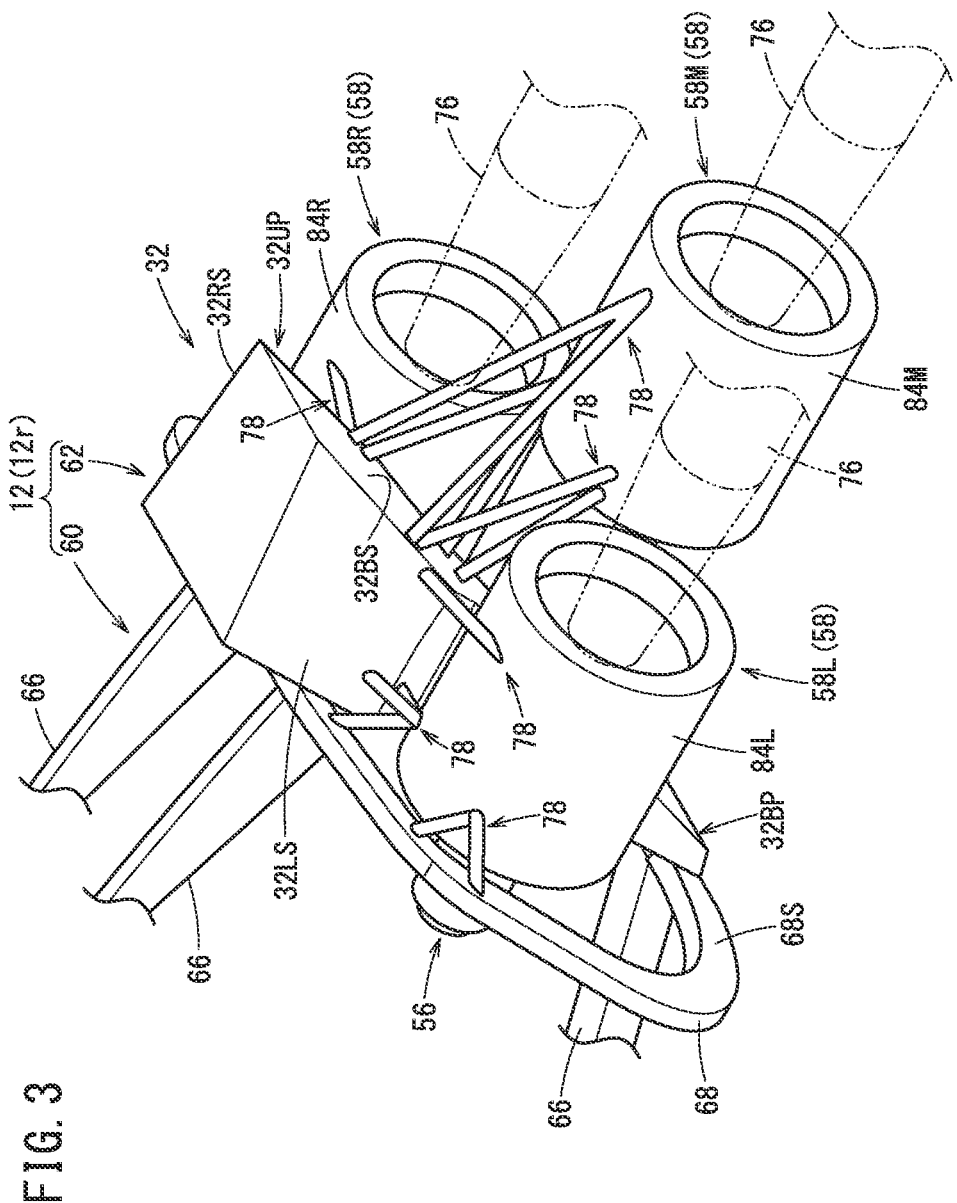
FIG. 3 is a diagram showing the structure of an internal combustion engine and its surroundings as viewed from the rear left and obliquely from above.
Figure 4:
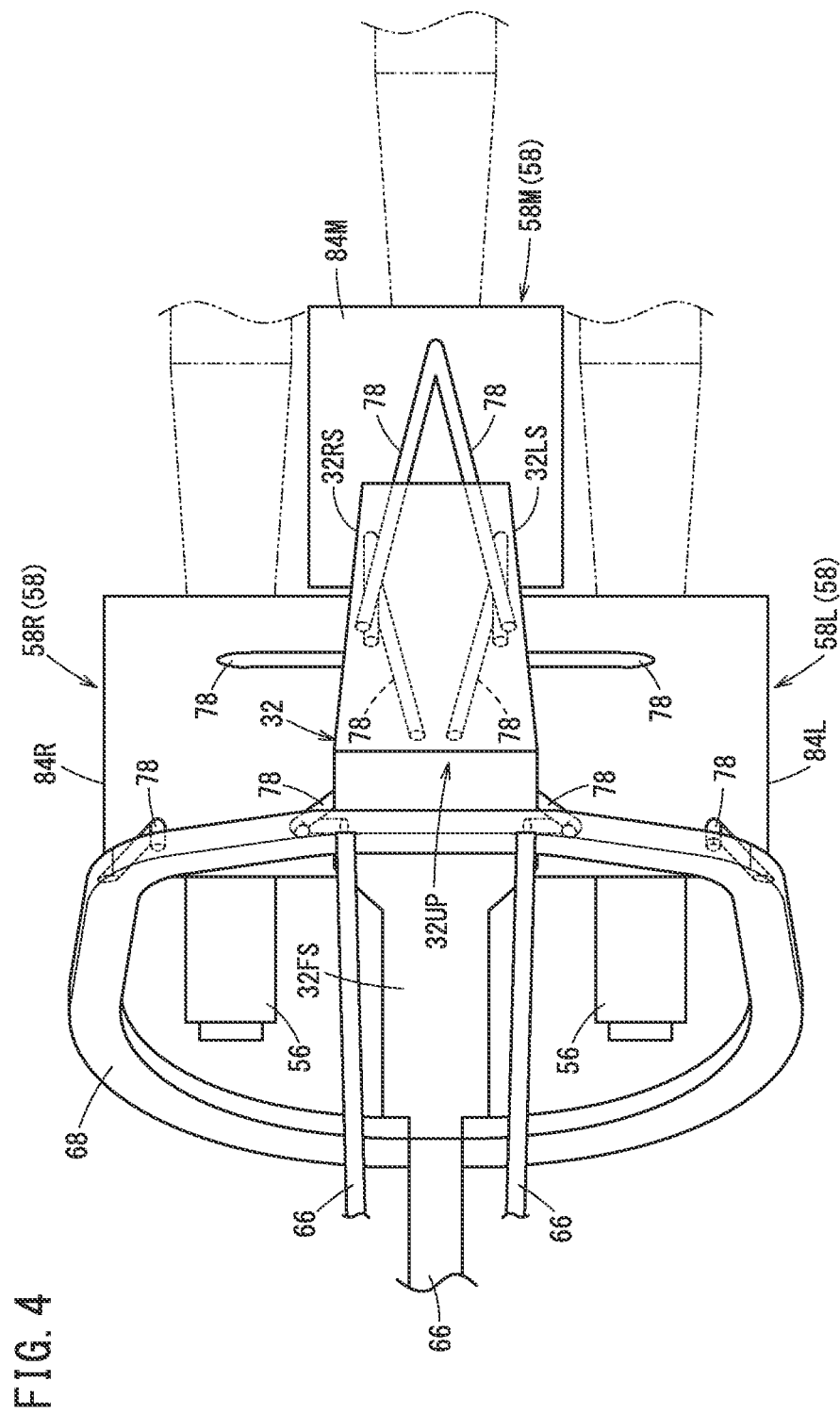
FIG. 4 is a diagram showing the structure of the internal combustion engine and its surroundings as viewed from above.

As shown in FIG. 2, toward the rear, the pair of takeoff and landing rotors 20a, the front wing 14, the pair of takeoff and landing rotors 20b, the pair of takeoff and landing rotors 20c, the rear wing 16, and the pair of takeoff and landing rotors 20d are disposed in this order.

Each of the two cruise rotors 22 includes a mast (not shown), a hub (not shown), and a plurality of blades 52 (not shown). The mast is connected to an output shaft portion of the electric motor (not shown). The hub is connected to the mast. The plurality of blades 52 are connected to the hub. A cylindrical duct 54 is provided around the cruise rotor 22. The mast is disposed below the rear wing 16. The mast is disposed parallel to the front-rear direction. The mast is rotatable about a rotation axis extending in the front-rear direction.

With such a structure, the cruise rotors 22 rotate about the rotation axis extending in the front-rear direction and generate thrust. One rotor unit for generating thrust includes one cruise rotor 22, a rotation mechanism (the electric motor or the like), and a control circuit. Note that one rotor unit may include one or more batteries.

Each of the two cruise rotors 22 is disposed on the fuselage rear portion 12r. The two cruise rotors 22 are located on the left side of the right-side takeoff and landing rotors 20a to 20d and on the right side of the left-side takeoff and landing rotors 20a to 20d. The two cruise rotors 22 are located behind the pair of takeoff and landing rotors 20c and in front of the pair of takeoff and landing rotors 20d. The rotation axes of the two cruise rotors 22 are located below the blades 46 of the eight takeoff and landing rotors 20.

The positions of the two cruise rotors 22 in the front-rear direction coincide with each other. The positions of the two cruise rotors 22 in the vertical direction also coincide with each other. Further, the two cruise rotors 22 are arranged side by side in the left-right direction. The right-side cruise rotor 22 is disposed to the right of the vertical plane including the central axis A of the fuselage 12. The right-side cruise rotor 22 is supported by the right wing of the rear wing 16. The left-side cruise rotor 22 is disposed to the left of the vertical plane including the central axis A of the fuselage 12. The left-side cruise rotor 22 is supported by the left wing of the rear wing 16.

2. Structure of Surroundings of Internal Combustion Engine 58

The structure of an internal combustion engine 58 and its surroundings will be described with reference to FIGS. 3 to 6. As shown in FIGS. 3 to 6, a plurality of sets of generators 56 and the internal combustion engines 58 are housed inside the fuselage rear portion 12r. A battery and a motor drive circuit are housed inside the fuselage rear portion 12r. Hereinafter, the aircraft 10 including three sets of the generators 56 and the internal combustion engines 58 will be described. However, the aircraft 10 may include two sets of the generators 56 and the internal combustion engines 58. The aircraft 10 may include four or more sets of the generators 56 and the internal combustion engines 58. The three internal combustion engines 58 are arranged around the pylon 32 supporting the rear wing 16. In the aircraft 10 including two sets of the generators 56 and the internal combustion engines 58, a first engine 58L and a second engine 58R are arranged in a form described later. Such aircraft 10 is not provided with a third engine 58M.

The fuselage 12 (fuselage rear portion 12r) includes a first fuselage portion 60 and a second fuselage portion 62. The second fuselage portion 62 is contiguously connected to a rear end portion of the first fuselage portion 60. The pylon 32 is provided between the first fuselage portion 60 and the second fuselage portion 62.

The first fuselage portion 60 is a main body of the fuselage 12. The first fuselage portion 60 has a semi-monocoque structure. The first fuselage portion 60 mainly includes a plurality of outer panels 64 (FIG. 5), a plurality of stringers 66, and a plurality of frames 68. In each of FIGS. 3 to 6, some of the plurality of stringers 66 and some of the plurality of frames 68 are shown.

The outer panels 64 are formed in a cylindrical shape. The outer panels 64 form an outer shape of the first fuselage portion 60. The stringers 66 and the frames 68 are reinforcing members for the outer panels 64. The plurality of stringers 66 and the plurality of frames 68 are provided at a plurality of locations on the inner wall of the first fuselage portion 60. The stringers 66 are provided along the front-rear direction of the first fuselage portion 60. The frames 68 are provided along the inner circumferential direction of the first fuselage portion 60.

The second fuselage portion 62 is a fairing. The frame 68 is provided at the rearmost end of the first fuselage portion 60. The surface of this frame 68 that faces rearward is referred to as a frame rear surface 68S. A front end portion of the second fuselage portion 62 is fastened to the frame rear surface 68S by bolts and nuts. The second fuselage portion 62 may be fixed to other portions. For example, the second fuselage portion 62 may be fixed to the pylon 32 or a projection 92 (FIG. 8) connected to the pylon 32. The second fuselage portion 62 is formed of a plate material. For example, the plate material is a honeycomb core panel, a stiffened panel, or the like. A space for housing the internal combustion engines 58 is defined inside the second fuselage portion 62.

The pylon 32 extends from a lower portion toward an upper portion of the second fuselage portion 62. The pylon 32 extends vertically through a central portion of the second fuselage portion 62 in the left-right direction. The pylon 32 protrudes upward from the upper surface of the second fuselage portion 62. The pylon 32 includes a pylon upper portion 32UP and a pylon lower portion 32BP. The pylon upper portion 32UP is fastened to an upper portion of the frame rear surface 68S by a fastener. The pylon lower portion 32BP is fastened to a lower portion of the frame rear surface 68S by a fastener.

Figure 5:
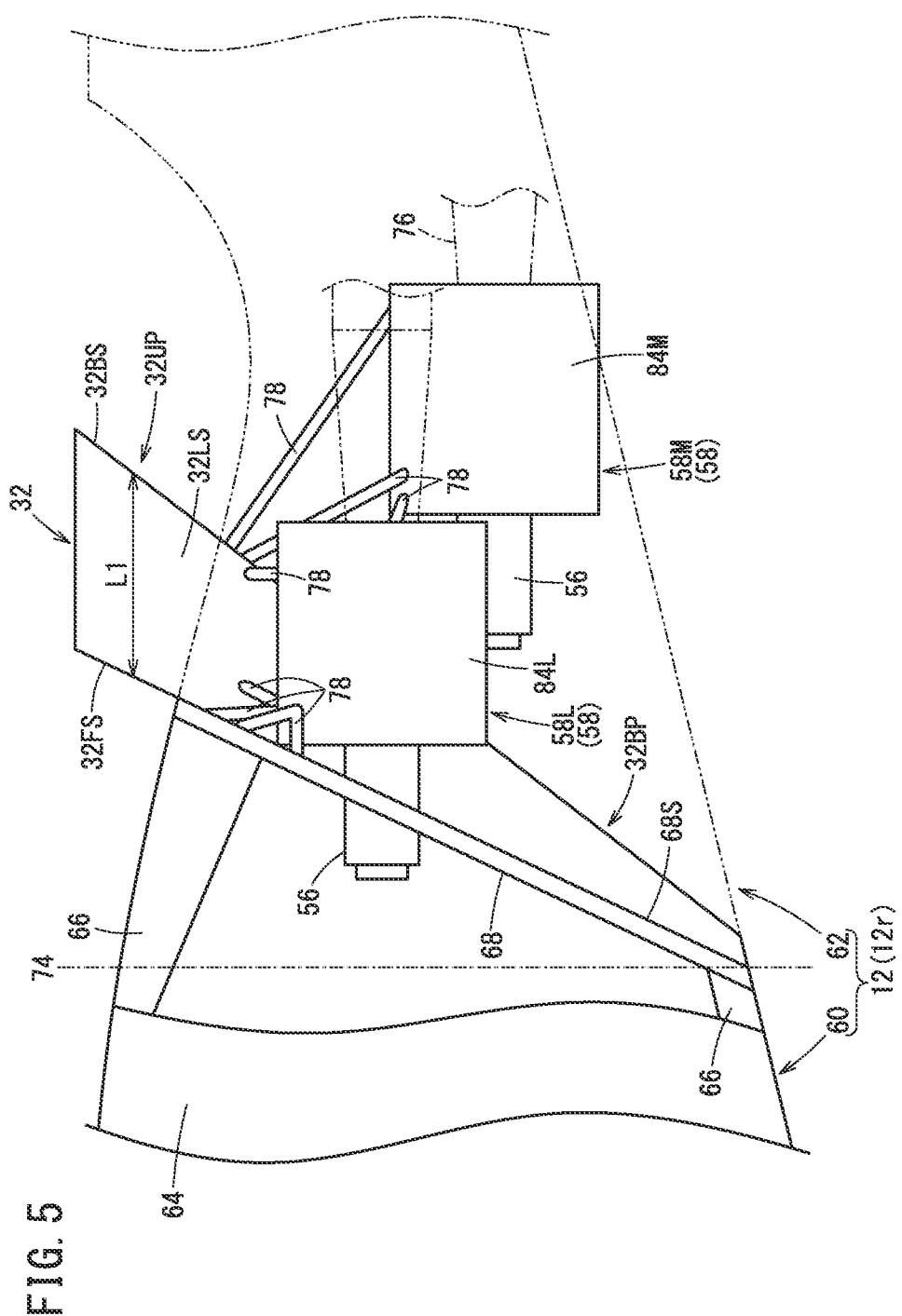
FIG. 5 is a diagram showing the structure of the internal combustion engine and its surroundings as viewed from the side (left side)
Figure 6:
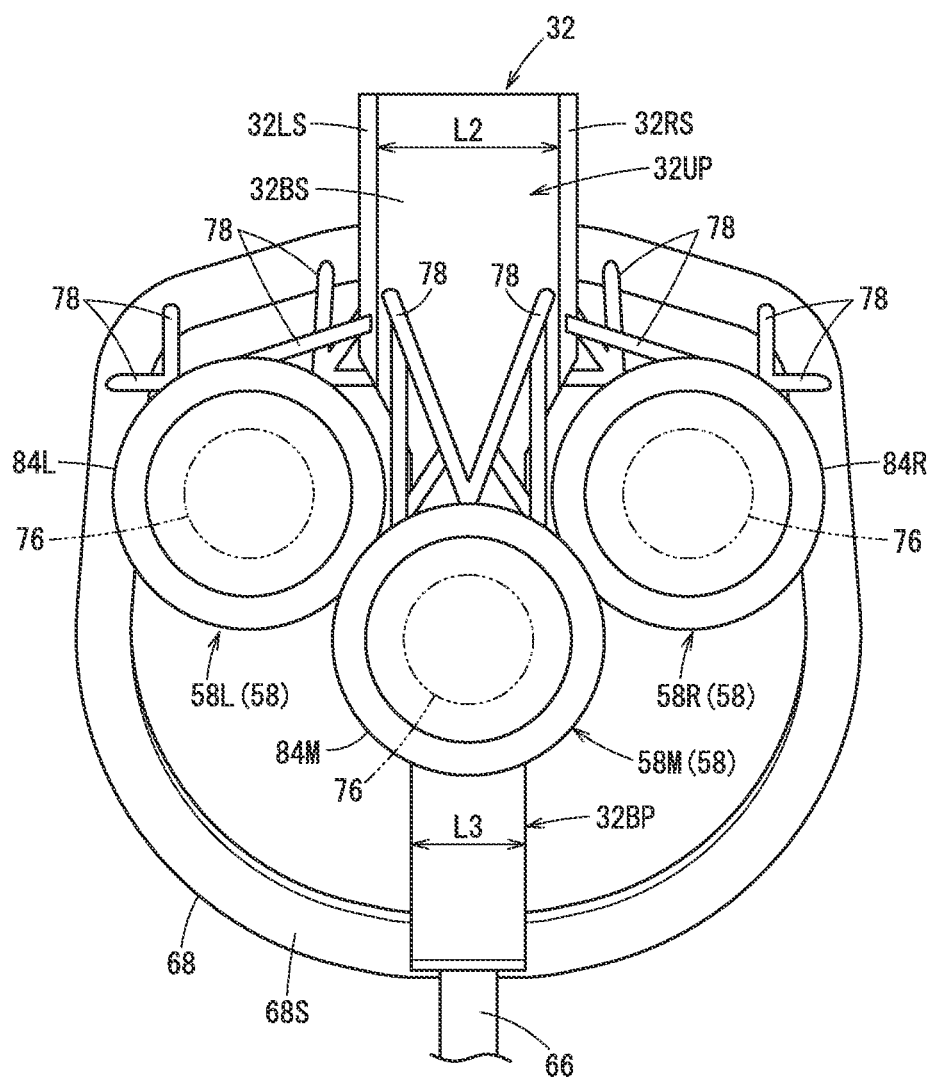
FIG. 6 is a diagram showing the structure of the internal combustion engine and its surroundings as viewed from the rear.

As shown in FIG. 5, the length of the pylon 32 in the front-rear direction is defined as a length L1. The front surface of the pylon 32 is referred to as a pylon front surface 32FS. The rear surface of the pylon 32 is referred to as a pylon rear surface 32BS. A plane that passes through the lower end portion of the pylon 32 and extends in the vertical direction and the left-right direction is referred to as a plane 74. The length L1 gradually decreases from the upper end portion toward the lower end portion of the pylon 32. Each of the pylon front surface 32FS and the pylon rear surface 32BS is inclined rearward with respect to the plane 74. As shown in FIG. 6, the length of the pylon upper portion 32UP in the left-right direction is defined as a length L2. The length of the pylon lower portion 32BP in the left-right direction is defined as a length L3. The length L2 is greater than the length L3. The length L2 and the length L3 may be equal to each other. The length L3 may be greater than the length L2.

The internal combustion engine 58 is, for example, a gas turbine engine. In this specification, the internal combustion engine 58 is also referred to as an engine 58. Each of the three engines 58 is housed inside the second fuselage portion 62. Each of the engines 58 is disposed such that an output shaft thereof faces forward. Further, an exhaust pipe 76 is connected to a rear portion of each engine 58.

At least one of the first fuselage portion 60 or the second fuselage portion 62 is provided with an intake port, an exhaust port, and a fuel supply device. The engine 58 is connected to the intake port and the fuel supply device. Further, the exhaust pipe 76 is connected to the exhaust port.

The generator 56 is disposed forward of the engine 58. An output shaft portion of the engine 58 is connected to a main shaft portion of the generator 56. The generator 56 is connected to the motor drive circuit. The engine 58 and the generator 56 function as a power unit for the takeoff and landing rotor 20 and a power unit for the cruise rotor 22.

The first engine 58L and the second engine 58R of the three engines 58 are disposed bilaterally symmetrically about the pylon 32. The first engine 58L is disposed on the left side of the pylon 32. The second engine 58R is disposed on the right side of the pylon 32. In other words, the position of the first engine 58L in the front-rear direction and the position of the second engine 58R in the front-rear direction are the same. The position of the first engine 58L in the vertical direction and the position of the second engine 58R in the vertical direction are also the same. On the other hand, the position of the first engine 58L in the left-right direction is different from the position of the second engine 58R in the left-right direction. The upper end of the first engine 58L and the upper end of the second engine 58R are located above a boundary between the pylon upper portion 32UP and the pylon lower portion 32BP. A part of the front end of the upper half of the first engine 58L and a part of the front end of the upper half of the second engine 58R abut on the frame rear surface 68S.

The third engine 58M is disposed between the first engine 58L and the second engine 58R. The third engine 58M is disposed at a position offset rearward from the position of the pylon 32. Further, the third engine 58M is disposed at a position offset downward from the position of the first engine 58L and the position of the second engine 58R. The position of the front end of the third engine 58M in the front-rear direction is substantially the same as the position of the rear end of the first engine 58L in the front-rear direction. The position of the front end of the third engine 58M in the front-rear direction is substantially the same as the position of the rear end of the second engine 58R in the front-rear direction. The upper end of the third engine 58M is located below the upper end of the first engine 58L and the upper end of the second engine 58R, and is located above the lower end of the first engine 58L and the lower end of the second engine 58R. Further, the left end of the third engine 58M is located to the left of the right end of the first engine 58L. The right end of the third engine 58M is located to the right of the left end of the second engine 58R. The first engine 58L, the second engine 58R, and the third engine 58M may be arranged at the same height.

3. Fixing Structure of Internal Combustion Engine 58

[3.1. First Fixing Structure]

Each engine 58 is fixed to the pylon 32. As an example, as shown in FIGS. 3 to 6, each engine 58 is fixed to the pylon 32 via at least one rod 78.

The first engine 58L has a cover 84L. The upper half of the cover 84L is provided with at least one bracket (not shown). The bracket of the first engine 58L is capable of supporting one end of at least one rod 78. Meanwhile, a left side surface 32LS of the pylon upper portion 32UP is provided with at least one bracket (not shown). The bracket of the pylon 32 is capable of supporting the other end of the at least one rod 78. One end of the rod 78 is connected to the bracket of the first engine 58L, and the other end of the rod 78 is connected to the bracket of the pylon 32. In this manner, the first engine 58L is fixed to the pylon 32 by at least one rod 78.

The first engine 58L is also fixed to the frame 68. The frame rear surface 68S is provided with at least one bracket (not shown). One end of the rod 78 is connected to the bracket of the first engine 58L, and the other end of the rod 78 is connected to the bracket on the frame rear surface 68S. In this manner, the first engine 58L is fixed to the frame 68 by at least one rod 78.

The fixing structure of the second engine 58R is the same as the fixing structure of the first engine 58L. At least one rod 78 is connected to a bracket provided on a cover 84R and a bracket provided on a right side surface 32RS of the pylon 32. Further, at least one rod 78 is connected to the bracket provided on the cover 84R and to brackets provided at a plurality of locations on the frame rear surface 68S. In this manner, the second engine 58R is fixed to the pylon 32 by at least one rod 78. The second engine 58R is also fixed to the frame 68 by at least one rod 78.

The third engine 58M has a cover 84M. The upper half of the cover 84M is provided with at least one bracket (not shown). The bracket of the third engine 58M is capable of supporting one end of at least one rod 78. Meanwhile, the pylon rear surface 32BS of the pylon upper portion 32UP is provided with at least one bracket (not shown). The bracket of the pylon 32 is capable of supporting the other end of the at least one rod 78. One end of the rod 78 is connected to the bracket of the third engine 58M, and the other end of the rod 78 is connected to the bracket of the pylon 32. In this manner, the third engine 58M is fixed to the pylon 32 by at least one rod 78.

[3.2. Second Fixing Structure]

Figure 7:
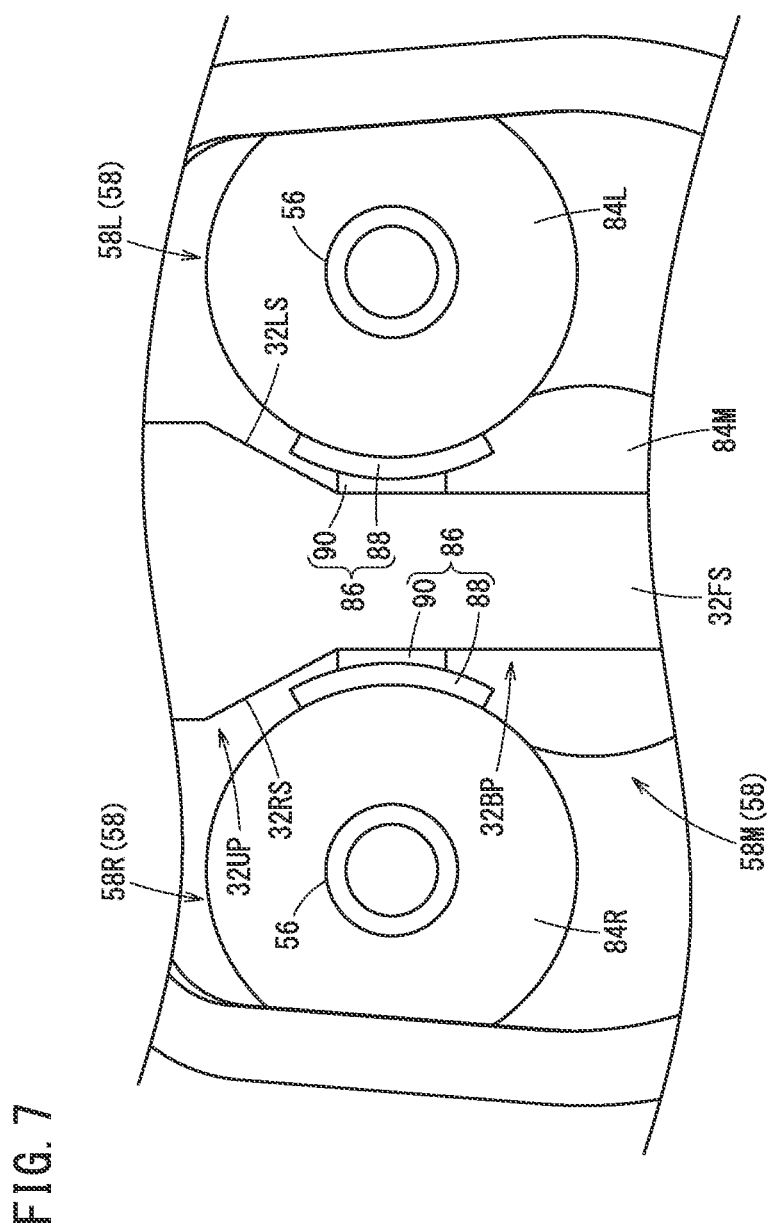
FIG. 7 is a diagram showing the structure of the internal combustion engine and its surroundings as viewed from the front.

As shown in FIG. 7, the first engine 58L may be fixed to the pylon 32 by an engine mount 86. The engine mount 86 includes a C-shaped frame 88 and a mount bracket 90. The C-shaped frame 88 is fixed to the outer peripheral surface of the cover 84L. The mount bracket 90 is fixed to the left side surface 32LS of the pylon lower portion 32BP. The C-shaped frame 88 is an arc-shaped member having the same radius of curvature as the outer peripheral shape of the cover 84L. The mount bracket 90 is permanently fastened to the left side surface 32LS by a fastener. The second engine 58R may also be fixed to the pylon 32 by the engine mount 86, similarly to the first engine 58L.

In order to fix the first engine 58L and the second engine 58R to the pylon 32, the engine mount 86 and a part or all of the rods 78 shown in FIGS. 3 to 6 may be used in combination.

[3.3. Third Fixing Structure]

Figure 8:
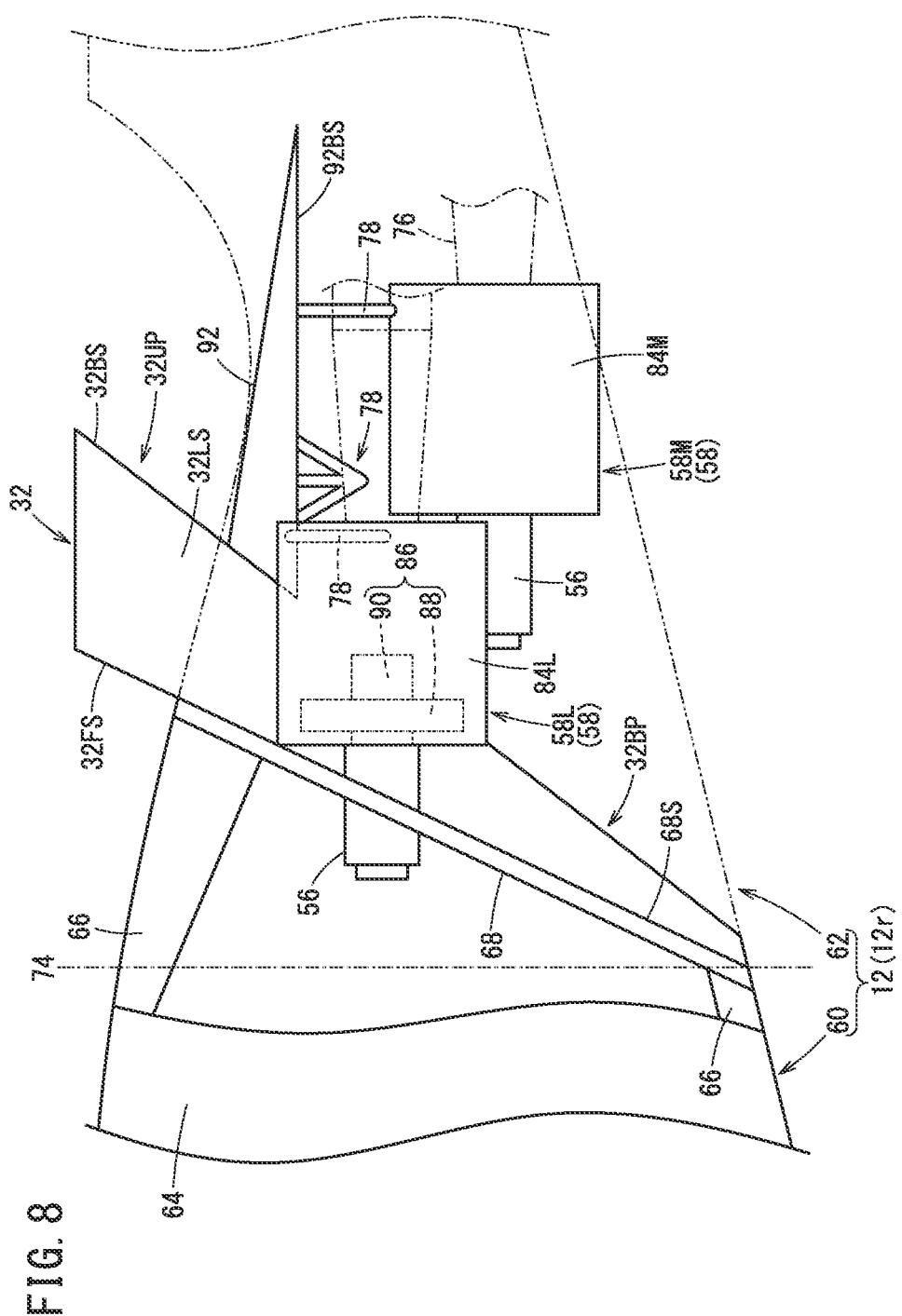
FIG. 8 is a diagram showing the structure of the internal combustion engine and its surroundings as viewed from the side (left side)
Figure 9:
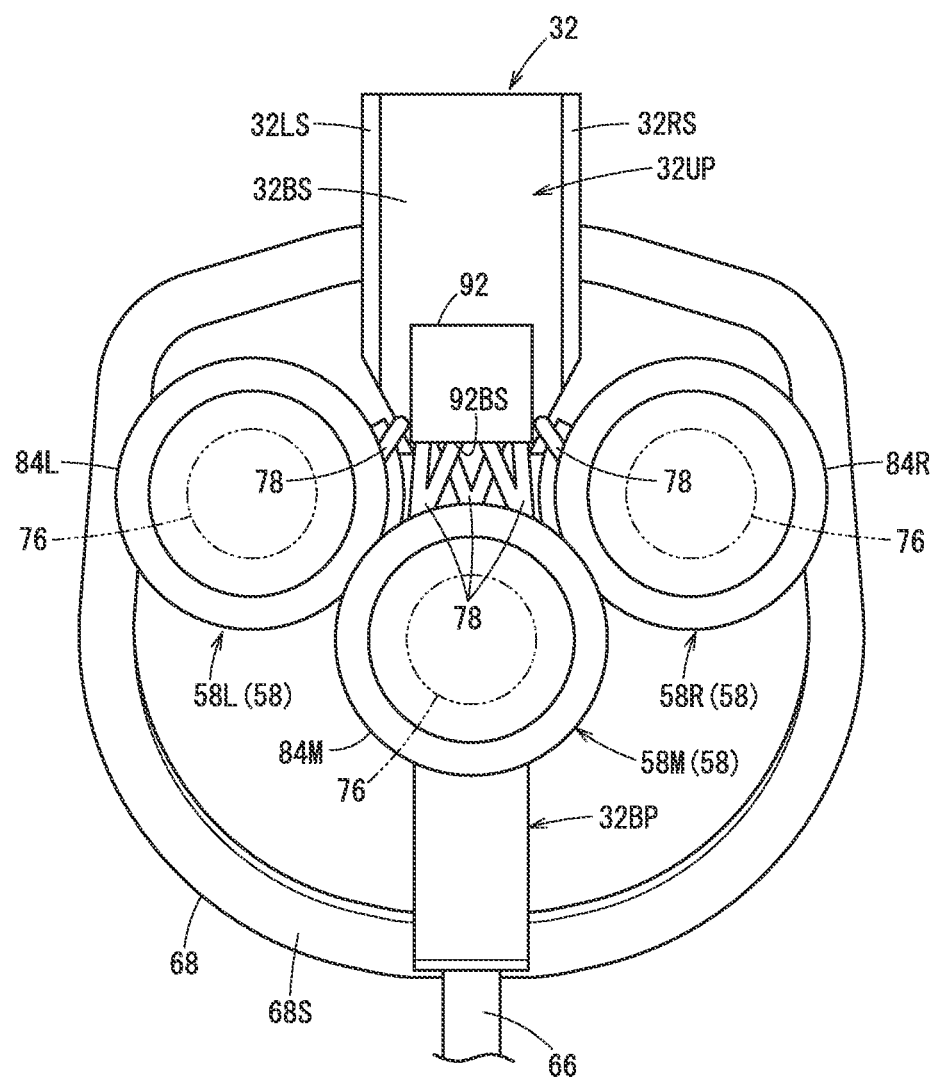
FIG. 9 is a diagram showing the structure of the internal combustion engine and its surroundings as viewed from the rear.

As shown in FIGS. 8 and 9, the projection 92 may be provided that projects rearward from the pylon 32. A lower surface 92BS of the projection 92 is located below the upper end of the first engine 58L and the upper end of the second engine 58R. The lower surface 92BS is located above the lower end of the first engine 58L, the lower end of the second engine 58R, and the upper end of the third engine 58M. The lower surface 92BS is substantially parallel to the front-rear direction. Further, the front end of the lower surface 92BS is located forward of the front end of the pylon 32. The rear end of the lower surface 92BS is located rearward of the rear end of the pylon 32. At least one rod 78 may be connected to the projection 92 instead of being connected to the pylon 32.

The first engine 58L and the second engine 58R are each fixed to the pylon 32 by the engine mount 86 shown in FIG. 7. Further, the first engine 58L and the second engine 58R are each fixed to the pylon 32 by the projection 92 and at least one rod 78. The third engine 58M is fixed to the pylon 32 by the projection 92 and at least one rod 78. Here, the rod 78 interposed between the projection 92 and each engine 58 is referred to as a first rod 78. The rod 78 interposed between the pylon 32 and each engine 58 is referred to as a second rod 78. By providing the projection 92 at a position close to each engine 58, the length of the first rod 78 can be made shorter than the length of the second rod 78.

4. Operation of Aircraft 10

Each engine 58 compresses air taken in from the intake port. Each engine 58 rotates an output shaft by injecting fuel into the compressed air and subjecting them to combustion. As the engine 58 is driven, the generator 56 generates power. The generator 56 supplies the power to the plurality of batteries and the electric motors of the respective rotor units via the motor drive circuit.

The takeoff and landing rotors 20 are used when the aircraft 10 takes off. The takeoff and landing rotors 20 are used when the aircraft 10 lands. The takeoff and landing rotors 20 are used when the aircraft 10 hovers. On the other hand, the cruise rotors 22 are used when the aircraft 10 is cruising.

Further, the takeoff and landing rotors 20 and the cruise rotors 22 are used together when the aircraft 10 transitions from hovering to cruising. Specifically, the takeoff and landing rotors 20 and the cruise rotors 22 are used together when the aircraft 10 moves forward at a speed equal to or higher than a first speed and lower than a second speed. The first speed is equal to or higher than 0 km/h. The second speed is higher than the first speed. When the aircraft 10 transitions from hovering to cruising, the aircraft 10 accelerates. During acceleration of the aircraft 10, the usage rate of the cruise rotors 22 is gradually increased. As the aircraft 10 accelerates, the lift generated by the wing increases. Therefore, the usage rate of the takeoff and landing rotors 20 is gradually reduced. For example, by reducing the rotational speed of the takeoff and landing rotors 20, the usage rate of the takeoff and landing rotors 20 is reduced. As the rotational speed of the takeoff and landing rotors 20 decreases, the lift decreases. Alternatively, by reducing the pitch angle of each blade, the usage rate of the takeoff and landing rotors 20 is reduced. As the pitch angle of each blade decreases, the lift decreases.

In addition, the takeoff and landing rotors 20 and the cruise rotors 22 are used together when the aircraft 10 transitions from cruising to hovering. Specifically, the takeoff and landing rotors 20 and the cruise rotors 22 are used together when the aircraft 10 moves forward at a speed equal to or higher than a third speed and lower than a fourth speed. The third speed is equal to or higher than 0 km/h. The fourth speed is higher than the third speed. When the aircraft 10 transitions from cruising to hovering, the aircraft 10 decelerates. During deceleration of the aircraft 10, the usage rate of the cruise rotors 22 is gradually reduced. As the aircraft 10 decelerates, the lift generated by the wing decreases. Therefore, the usage rate of the takeoff and landing rotors 20 is gradually increased. For example, the usage rate of the takeoff and landing rotors 20 is increased by increasing the rotational speed of the takeoff and landing rotors 20. As the rotational speed of the takeoff and landing rotors 20 increases, the lift increases. Alternatively, by increasing the pitch angle of each blade, the usage rate of the takeoff and landing rotors 20 is increased. As the pitch angle of each blade increases, the lift increases.

5. Other Embodiment

In the embodiment described above, the aircraft 10 includes eight takeoff and landing rotors 20. Alternatively, the aircraft 10 may include seven or fewer or nine or more takeoff and landing rotors 20.

6. Invention Obtained from Embodiments

The invention that can be understood from the above embodiments will be described below.

According to an aspect of the present invention, provided is an aircraft 10 comprising: a fuselage 12; a wing (rear wing 16) disposed above the fuselage 12; a pylon 32 configured to connect the wing to the fuselage 12; and a plurality of internal combustion engines 58 housed in the fuselage 12, wherein the pylon 32 vertically traverses the fuselage 12 and is fixed to an upper portion and a lower portion of the fuselage 12, and, among the plurality of internal combustion engines 58, a first internal combustion engine (first engine 58L) and a second internal combustion engine (second engine 58R) are disposed bilaterally symmetrically about the pylon 32, and are fixed to the pylon 32.

The pylon 32 is positioned at the center portion of the fuselage 12 in the left-right direction, and has enough strength to support the main wing (rear wing 16) from the lower side. According to the above configuration, the two internal combustion engines 58 (the first engine 58L and the second engine 58R) are disposed on the left and right sides of the pylon 32, and are fixed thereto. Accordingly, the internal combustion engines 58 can be disposed in a well-balanced manner and stabilized inside the fuselage 12.

In the aspect of the present invention, among the plurality of internal combustion engines 58, a third internal combustion engine (third engine 58M) may be disposed at a position offset rearward and downward from a position between the first internal combustion engine (first engine 58L) and the second internal combustion engine (second engine 58R).

According to the above configuration, the three internal combustion engines 58 (the first engine 58L, the second engine 58R, and the third engine 58M) can be disposed in a well-balanced manner and stabilized inside the fuselage 12.

In the aspect of the present invention, the pylon 32 may have a shape in which a length L1 of the pylon 32 in a front-rear direction decreases from an upper end portion of the pylon 32 toward a lower end portion thereof, and the pylon 32 may be disposed so as to be inclined rearward with respect to a plane 74 passing through the lower end portion of the pylon 32 and extending in a vertical direction and a left-right direction.

In the aspect of the present invention, the fuselage 12 may include a first fuselage portion 60, and a second fuselage portion 62 contiguously connected to a rear end portion of the first fuselage portion 60, the first fuselage portion 60 may include a plurality of outer panels 64, a plurality of stringers 66, and a plurality of frames 68, the pylon 32 may be fixed to an upper portion and a lower portion of a rear surface (frame rear surface 68S) of one of the frames 68, and the first internal combustion engine (first engine 58L) and the second internal combustion engine (second engine 58R) may be housed in the second fuselage portion 62.

According to the above configuration, the pylon 32 is fixed to the frame 68 serving as a reinforcing member. Therefore, the pylon 32 is stabilized. As a result, the internal combustion engines 58 are also stabilized.

In the aspect of the present invention, the first internal combustion engine (first engine 58L) and the second internal combustion engine (second engine 58R) may be fixed to the frame 68.

According to the above configuration, the internal combustion engines 58 (the first engine 58L and the second engine 58R) are more stable.

In the aspect of the present invention, an output shaft of each of the internal combustion engines 58 may be connected to a main shaft of a generator 56.

Note that the aircraft according to the present invention is not limited to the above-described embodiments, and various configurations can be adopted therein without departing from the gist of the present invention.

What is claimed is:

1. An aircraft comprising:
   a fuselage;
   a wing disposed above the fuselage;
   a pylon configured to connect the wing to the fuselage; and a plurality of internal combustion engines housed in the fuselage, wherein the pylon vertically traverses the fuselage and is directly fixed to an upper portion and directly fixed to a lower portion of the fuselage, and among the plurality of internal combustion engines, a first internal combustion engine and a second internal combustion engine are disposed bilaterally symmetrically about the pylon, and are fixed to the pylon.

2. The aircraft according to claim 1, wherein
among the plurality of internal combustion engines, a third internal combustion engine is disposed at a position offset rearward and downward from a position between the first internal combustion engine and the second internal combustion engine.

3. The aircraft according to claim 1, wherein
the pylon has a shape in which a length of the pylon in a front-rear direction decreases from an upper end portion of the pylon toward a lower end portion thereof, and the pylon is disposed so as to be inclined rearward with respect to a plane passing through the lower end portion of the pylon and extending in a vertical direction and a left-right direction.

4. The aircraft according to claim 1, wherein
the fuselage includes a first fuselage portion, and a second fuselage portion contiguously connected to a rear end portion of the first fuselage portion, the first fuselage portion includes a plurality of outer panels, a plurality of stringers, and a plurality of frames, the pylon is fixed to an upper portion and a lower portion of a rear surface of one of the frames, and the first internal combustion engine and the second internal combustion engine are housed in the second fuselage portion.

5. The aircraft according to claim 4, wherein
the first internal combustion engine and the second internal combustion engine are fixed to the frame.

6. The aircraft according to claim 1, wherein
an output shaft of each of the internal combustion engines is connected to a main shaft of a generator.

* * * * *